Sept. 9, 1969 W. A. POHLE 3,466,073

LOCKED ASSEMBLY

Filed Oct. 12, 1967

INVENTOR

WILLIAM A. POHLE

BY

James W. Cyles
John H. Oltman

ATTORNEYS

United States Patent Office 3,466,073
Patented Sept. 9, 1969

3,466,073

LOCKED ASSEMBLY

William A. Pohle, Hallandale, Fla., assignor to Crane Engineering Company, Incorporated, Hallandale, Fla., a corporation of Florida Filed Oct. 12, 1967, Ser. No. 674,825
Int. Cl. F16c *11/00;* B25g *3/38*
U.S. Cl. 287—100 5 Claims

ABSTRACT OF THE DISCLOSURE

A preferred embodiment of the locked assembly includes a shaft which is locked to an annular member and a support by a locking ring which fits in a circumferential groove in the shaft and is also received in a recess having a retaining surface which radially confines the locking ring to inhibit loss of the locking ring from the groove, even if the locking ring should break during use. The shaft can be simply inserted into the support, annular member and locking ring, and the locking ring is guided into the groove in the shaft without the use of a separate tool. The locked assembly may be part of a rocker arm, but this is not essential.

BACKGROUND OF THE INVENTION

There are many types of locking rings which are variously mounted. For instance, one locking ring in common use is affixed in an annular groove on a shaft to retain the shaft or a component to the shaft. Constant severe motion or shock to the assembly causes wear of the groove and wear and breakage of the locking ring, and failure of the assembly will occur with a sustained period of use.

SUMMARY OF THE INVENTION

It is now proposed in accordance with the invention to mount a locking ring in an annular groove in one structure, and in addition, provide a surface in an adjacent assembly member to retain the locking ring against radial movement thereof. Even if the locking ring should break, the pieces are likely to be retained by the retaining surface and locking of the assembly is maintained by inertia of the pieces due to motion of the assembly, or by gravity.

It is an object of this invention to provide a locking ring mounted in a groove with an adjoining retaining surface which positively retains the ring in the event of radial movement or breakage, thus maintaining the integrity of the assembly even when in motion.

Another object of the invention is to provide a locked assembly in which a locking ring fits in a groove on a shaft, and an annular member through which the shaft extends has a recess bounded by an annular surface which retains the locking ring against radial movement to assure retention of the locking ring in the groove even if the locking ring should break.

Another object of the invention is to provide a simplified assembly feature to permit retaining and centering of the locking ring to facilitate rapid insertion of the shaft into the assembly with placement of the locking ring within the circumferential groove of the shaft without the use of a separate tool.

Another object of the invention is to provide a locking ring affixed to a circumferential groove in a protrusion or shaft of an assembly and a retaining recess as a counterbore or groove provided in or adjacent to the bore of another member of the assembly.

Other objects of this invention will appear in the following description and appended claims, reference being had to the accompanying drawings forming a part of this specification wherein like reference characters designate corresponding parts in the several views.

On the drawings

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings

Figure 1:
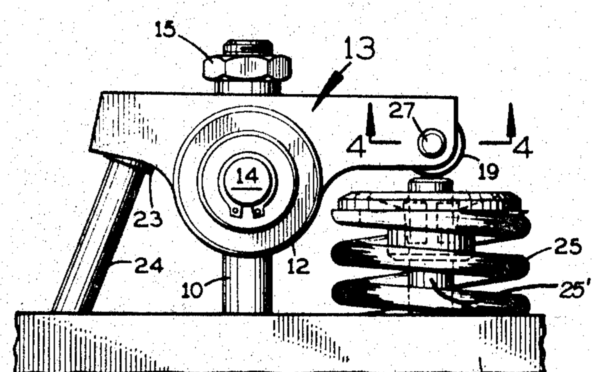
FIGURE 1 is a side elevational view of a rocker arm including a locked assembly in accordance with the invention.
Figure 2:
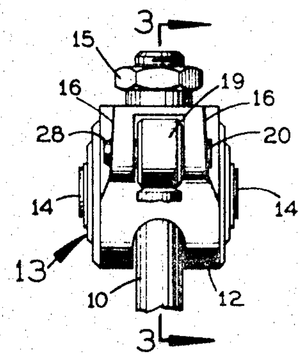
FIGURE 2 is an end view of the rocker arm, parts being omitted.
Figure 3:
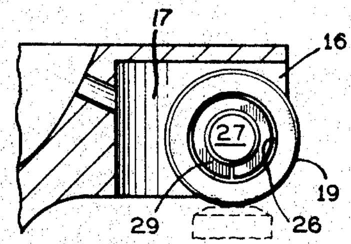
FIGURE 3 is an enlarged fragmentary sectional view taken substantially on line 3—3 of FIGURE 2 showing the locked assembly.
Figure 4:
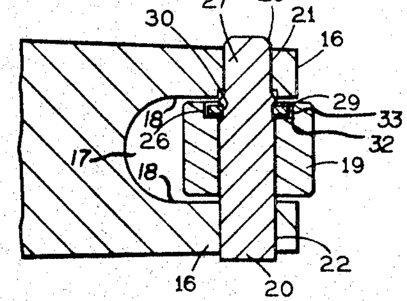
FIGURE 4 is a fragmentary sectional view taken substantially on line 4—4 of FIGURE 1 also showing the locked assembly.
Figure 5:
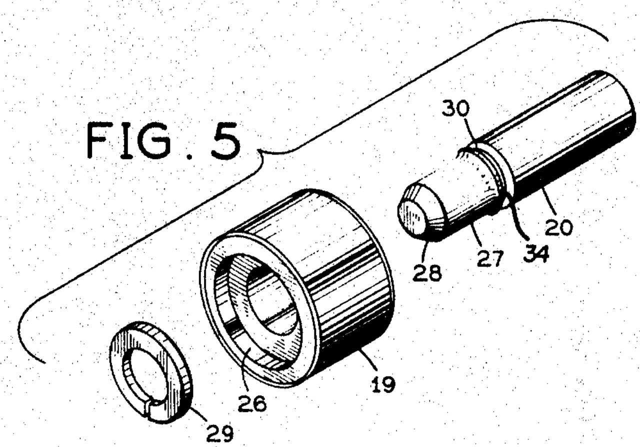
FIGURE 5 is an exploded perspective view showing a locking ring, a roller and a shaft as they might be positioned before assembly of the locked assembly.

In FIGURES 1 and 2, a rocker arm is shown, and the locked assembly of the invention is included within the rocker arm. The rocker arm is shown only to illustrate one practical application of the invention, but it is to be understood that the locked assembly of the invention can be applied in many other ways and is not limited to a rocker arm mounting.

In FIGURES 1 and 2, a vertical shaft 10 is mounted on a head 11 of an internal combustion engine, and shaft 10 has a free end extending upwardly through a hub 12 of a rocker arm indicated as a whole by the numeral 13. Rocker arm 13 is held in rockable position upon a horizontal shaft 14 by a threaded sleeve 15. Rocker arm 13 has spaced apart side walls 16 forming a space or cavity 17 which is bounded by spaced opposed surfaces 18. A roller 19 is mounted in the space 17 on a shaft 20 which fits into cylindrical bores 21 and 22 of the spaced apart walls 16 and extends across space 17. Roller 19 engages a valve stem 25' which is biased by a spring 25, and a pad 23 at the other end of rocker arm 13 engages a push rod 24. As the rocker arm 13 is actuated by the push rod 24, it will rock on the shaft 14 and will reciprocally rock when actuated by the spring action of valve stem 25' and spring 25.

FIGURES 3–6 illustrate how the shaft 20 is locked to the roller 19 and the support structure which includes spaced arm 16. Shaft 20 has a circumferential groove 30 formed therein, and a split locking washer 29 fits within this groove. Locking washer 29 and groove 30 are located next to the upper wall surface 18, and locking ring 29 is engageable with this upper wall surface to limit movement of shaft 20 toward the upper wall surface. Roller 19 has a recess 26 therein including a radial surface 32 and an annular surface 33 which, together with upper wall surpface 18 form a chamber in which locking ring 29 is enclosed. Locking ring 39 is engageable with surface 32 and the lower end of roller 19 is engageable with the lower wall surface 18 to limit longitudinal motion of shaft 20 away from the upper wall surface 18.

The circumferential surface 33 or roller 19 is spaced from but very close to the peripheral surface of locking ring 29, and thus limits radial movement of locking ring 29 so as to retain ring 29 in groove 30. Even if ring 29 should break, the pieces tend to be retained in groove 30 by the annular surface 33 so that the integrity of the locked assembly is likely to be maintained even when such breakage occurs. It may be noted that some modifications of the locking structure may be made within the scope of the invention. For instance, recess 26 could be formed in upper wall 16 rather than in roller 19, and the locking ring could then be retained in this recess. Also, it would be possible to provide a groove in roller 19 in which the locking ring is retained by a peripheral surface of shaft 20.

The locked assembly is so designed that it may be assembled very easily without the use of special tools. This is illustrated particularly by FIGURES 5 and 6. Shaft 20 has a reduced diameter end portion 27 on one side of groove 30, and the diameter of portion 27 may be less than the inside diameter of locking ring 29, and also less than the portion of shaft 20 on the other side of groove 30. A step 34 is formed on the reduced end portion 27 directly adjacent groove 30, and although this step is greater in diameter than the inside diameter of locking ring 29, the locking ring may be expanded over and guided over this step as it is being forced into groove 30. The reduced end portion 27 is beveled as shown at 28 so that the shaft may be easily guided into the bores in which it fits.

Figure 6:
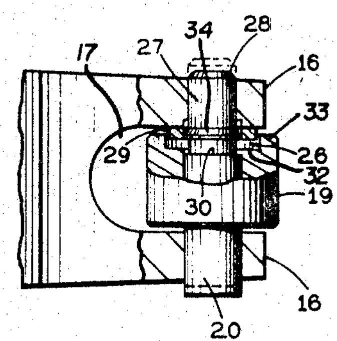
FIGURE 6 is a view partly in section and partly in elevation showing the locking ring as it is being guided into a groove on the shaft during assembly of the locked assembly.

In assembling the locked assembly, locking ring 29 is placed in recess 26 of roller 19, and these parts are placed in the space 17 between spaced apart walls 16. Reduced end portion 27 of shaft 20 is inserted through lower wall 16, roller 19, locking ring 29 and upper wall 16 to the position shown in FIGURE 6 in solid lines. As the shaft is inserted, locking ring 29 is guided along reduced end portion 27 of shaft 20, and as shown in FIGURE 6, ring 29 is expanded as it passes over step 34. Shaft 20 is then pushed, as by a hammer blow, to the position shown in FIGURE 6 by dashed lines, and locking ring 29 then snaps into groove 30. The shaft 20, roller 19 and support arms 16 are then locked together in the manner described previously, and locking ring 29 is positively retained in groove 30 by annular wall 33 at the boundary of recess 26.

Thus, the invention provides a locked assembly in which a locking ring is seated in a groove in one member and is positively retained in the groove by a retaining surface on another member. The groove is normally provided in a shaft, and the retaining surface is normally provided in a recess in or adjacent to the bore of a member through which the shaft extends. The locked assembly may be assembled together very conveniently without the use of special tools.

Having thus described my invention, I claim:

1. An assembly in which a shaft is locked in an annular member, including a combination a shaft having a circumferential groove therein, support means having a space therein defined by first and second spaced surfaces, said support means supporting said shaft and positioning said shaft with said groove adjacent to said first surface, a split locking ring in said groove, and an annular member in said space having a bore through the same through which said shaft extends and having third and fourth surfaces respectively adjacent said first and second surfaces, one of said first and third surfaces having a recess therein forming with the other of said first and third surfaces, a chamber receiving said locking ring therein and enclosing said locking ring sufficiently closely to assure retention of said locking ring in said groove even if said locking ring should break, said recess being bounded by a radially extending surface and an axially extending annular surface both adjacent to said ring, said annular surface being spaced from said ring a distance sufficient to allow assembling of the parts by placing said ring in said recess and inserting said shaft through said bore and into said support means, said shaft having a surface of sufficiently great diameter to expand said split ring toward said annular surface during insertion of said shaft as aforesaid with said ring snapping into said groove when said shaft is fully seated, and yet said annular surface being sufficiently close to inhibit loss of said ring when the parts are fully assembled; said shaft having an intermediate portion on one side of said groove of predetermined diameter and a reduced end portion on the other side of said groove having a diameter smaller than said predetermined diameter over which said locking ring is guided into said groove as said shaft is inserted into said support means, said annular member and said locking rings; the diameter of said reduced portion being smaller than the inside diameter of said locking ring, and said shaft having a step directly adjacent said groove on said end portion larger in diameter than said inside diameter of said locking ring but over which said locking ring may be guided into said groove.

2. The assembly as claimed in claim 1 in which said shaft has a sliding fit in said bore of said annular member and in said support means so that said shaft may be inserted into said support means, said annular member and said locking ring substantially simultaneously to seat said locking ring in said groove to thereby lock said shaft in place.

3. The assembly as claimed in claim 1 in which said reduced end portion of said shaft has a beveled surface at the end thereof for facilitating guiding of said shaft while inserting the same in said support means, said annular member and said locking ring.

4. The assembly as claimed in claim 1 in which said annular member is a roller.

5. The assembly as claimed in claim 4 in which said support means comprises a bifurcated member having spaced arms on which said first and second spaced surfaces are provided, said shaft extending between and through said arms.

References Cited

UNITED STATES PATENTS

| | | | |
|---|---|---|---|
| 1,993,875 | 3/1935 | Daub. | |
| 2,482,312 | 9/1949 | Bachle | 74—519 XR |
| 2,824,772 | 2/1958 | Petersen | 85—818 XR |
| 2,897,022 | 7/1959 | Marola | 85—818 XR |

FOREIGN PATENTS

| | | |
|---|---|---|
| 87,264 | 2/1922 | Austria. |
| 226,262 | 1/1960 | Australia. |

DAVID J. WILLIAMOWSKY, Primary Examiner

A. V. KUNDRAT, Assistant Examiner

U.S. Cl. X.R.

74—251; 123—90